…

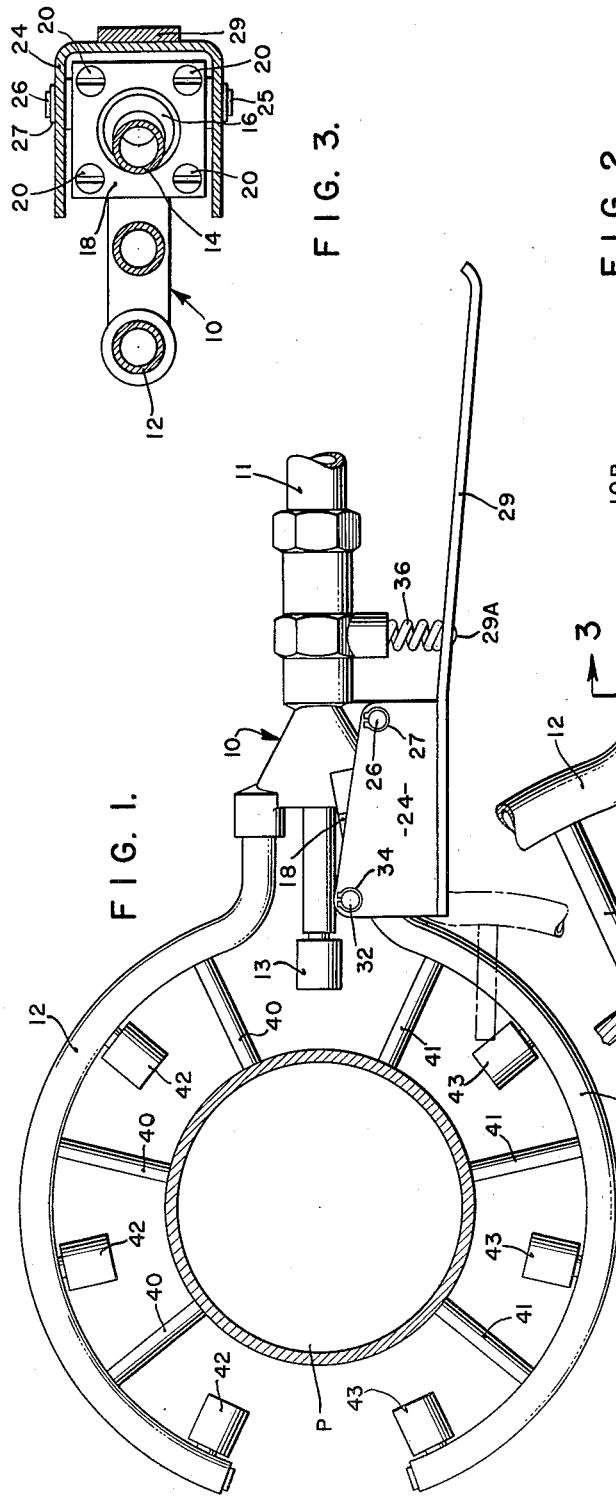
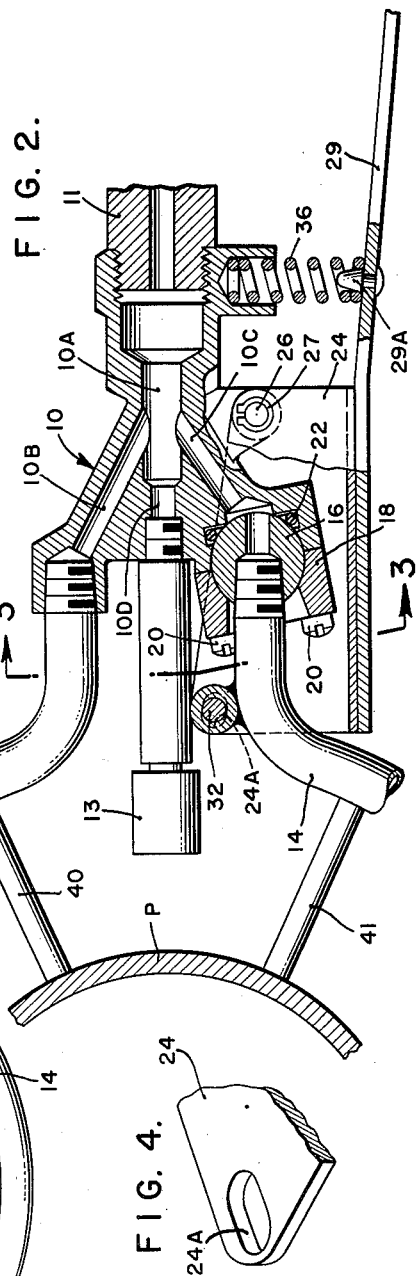

United States Patent Office 3,088,515
Patented May 7, 1963

3,088,515
WORK HEATING APPARATUS

Joseph S. Fagan, Dana Point, Calif., assignor to Mutual Liquid Gas & Equipment Company, Inc., Gardena, Calif., a corporation of California
Filed Apr. 4, 1960, Ser. No. 19,567
1 Claim. (Cl. 158—107)

The present invention relates to an improved device for heating circular objects such as, for example, pipes in the process of joining, as for example by soldering, to other pipes, tubing or fittings.

Briefly the structure shown herein involves two arcuate-shaped gas manifolds which are pivoted one with respect to the other to allow the same to centrally embrace a pipe. One of the important features of the construction is that it incorporates a ball-and-socket type of gas connection to one of the manifolds in a relatively simple construction.

An object of the present invention is to provide an improved device of this character in which one of the manifolds pivots about an axis corresponding to the axis of a ball forming also a gas conduit for the pivoted manifold.

Another object of the present invention is to provide an improved device of this character in a relatively simple and compact structure.

The features of the present invention which are believed to be novel are set forth with particularity in the appended claim. This invention itself, both as to its organization and manner of operation, together with further objects and advantages thereof, may be best understood by reference to the following description taken in connection with the accompanying drawings in which:

FIGURE 1 is a top plan view of a device embodying features of the present invention.

FIGURE 2 shows a portion of the same in cross-section.

FIGURE 3 is a sectional view taken generally on the line 3—3 of FIGURE 2.

FIGURE 4 is a perspective view showing a portion of the generally U-shaped pivoted plate illustrated also in the other figures.

The device incorporates a special fitting 10 bored to provide the gas inlet channel 10A, the two branch channels 10B and 10C extending outwardly therefrom and the third channel 10D extending coaxially with the main inlet channel 10A.

This fitting 10 is internally threaded to provide a connection for the gas inlet line 11 and to provide a connection for the gas manifold 12; and a third threaded connection is provided for the gas jet 13 disposed between the fixed manifold 12 and the other pivotal manifold 14. This manifold 14 is pivoted on the fitting 10 in a manner now described.

The threaded end of the manifold 14 is threaded in the ball 16 which is retained in a complementary spherical seat defined in part by a spherical surface on the fitting 10 and a spherical surface on the ring-shaped retainer 18, such retainer 18 being releasably secured to the fitting 10 by the four bolts 20 so as to firmly maintain the apertured ball 16 against the O-ring seal 22 recessed in an annular grooved portion of fitting 10.

The manifold 14 is pivotal about the axis of the ball 16 and in all pivoted positions thereof the O-ring seal 22 prevents gas leakage at this gas connection.

The manifold 14 is manually pivotal on the fitting 10 using the following described construction.

A generally U-shaped plate 24 is pivoted on the pins 25 and 26 extending from the fitting 10 and its retention may be assured by use of conventional spring washers 27. A handle member 29 is secured to this plate 24 as, for example, by welding or brazing. The plate 24 is provided with elongated apertured portions 24A to receive the pin 32 suitably affixed as, for example, by welding or brazing to the manifold 14. Opposite ends of the pin 32 may be grooved to receive conventional spring-type retaining washers 34. A prestressed coil compression spring 36 may have one of its ends recessed in the fitting 10 and the other one of its ends encircling a pin 29A riveted on the handle 29 to normally urge the two manifolds 12 and 14 in the position shown in FIGURE 1 wherein the radially-extending pins 40 and 41 respectively on the manifolds 12 and 14 serve to centrally position these two manifolds about the axis of the work piece illustrated herein as the pipe P. These two manifolds 12 and 14 feed gas to the gas jets 42 and 43 respectively which, together with the other gas jet 13, direct a series of flames inwardly towards the pipe P to achieve a uniform circumferential heating of the same.

To remove the device with respect to the pipe P shown in FIGURE 1, the operator simply presses the handle 29 towards the fitting 10 in which case the U-shaped plate 24 pivots about its pivot pins 25 and 26 to in turn pivot the manifold 14 about an axis of the ball 16. The elongated slots 24A in the plate 24 are provided to allow this action and provide a sliding connection between such plate 24 and manifold 14. The provision of elongated slot 24A is considered essential, considering the fact that there are two pivoting axes, namely first, the axis of ball 16 and secondly, the aligned axes of pins 25, 26, and because of the geometry there would be a binding between pin 32 and opening 24A in the absence of the elongated opening or slot 24A.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

Heating apparatus of the character described comprising a fitting having a main gas inlet and a pair of gas outlets in communication with the inlet, a first arcuate-shaped manifold on said fitting and in communication with one of said outlets, a plurality of jets spaced along said first manifold and extending inwardly and radially thereof, a second arcuate-shaped manifold terminating in an apertured ball having its apertured portion in communication with the other outlet, a plurality of jets spaced along said second manifold and extending inwardly and radially thereof, said fitting being provided with a spherical seat for said ball, a ball retainer also having a spherical seat contacting said ball and secured to said fitting, an O-ring seal interposed between said ball and said fitting, and means for pivoting said second manifold about an axis of said ball, said last-mentioned means comprising lever means pivotally mounted on said fitting and a sliding connection between said lever means and a portion of said second manifold.

References Cited in the file of this patent

UNITED STATES PATENTS

| | | |
|---|---|---|
| 2,417,491 | Hill | Mar. 18, 1947 |
| 2,447,960 | Rickets et al. | Aug. 24, 1948 |
| 2,477,467 | Rose | July 26, 1949 |
| 2,593,295 | Granfield | Apr. 15, 1952 |

FOREIGN PATENTS

| | | |
|---|---|---|
| 122,991 | Great Britain | Feb. 13, 1919 |
| 1,162,924 | France | Apr. 21, 1958 |

OTHER REFERENCES

Vogel: German application, Serial No. A21456, printed December 6, 1956 (Kl.4g $44_{50}$).